United States Patent [19]
Nakano

[11] Patent Number: 5,684,767
[45] Date of Patent: Nov. 4, 1997

[54] TRACK JUMP CONTROL CIRCUIT OF OPTICAL DISK APPARATUS PROPERLY CONTROLLING TIMING OF ACCELERATING PULSES AND DECELERATING PULSES, AND PERFORMING STABLE TRACK JUMP

[75] Inventor: Junichi Nakano, Hino, Japan

[73] Assignee: Olympus Optical Co., Ltd., Tokyo, Japan

[21] Appl. No.: 504,828

[22] Filed: Jul. 20, 1995

[30] Foreign Application Priority Data

Aug. 23, 1994 [JP] Japan .................................. 6-198818

[51] Int. Cl.$^6$ ............................................. G11B 7/09
[52] U.S. Cl. .......................... 369/44.28; 369/44.27; 369/44.34; 369/32
[58] Field of Search .................. 369/32, 44.28, 369/44.27, 44.29, 44.25, 44.32, 44.34, 44.35, 47, 48, 54, 58, 43

[56] References Cited

U.S. PATENT DOCUMENTS

| | | | |
|---|---|---|---|
| 5,195,069 | 3/1993 | Nakano | 369/44.28 X |
| 5,216,650 | 6/1993 | Noguchi | 369/44.28 |
| 5,285,432 | 2/1994 | Nakane | 369/44.28 X |
| 5,408,454 | 4/1995 | Hasegawa | 369/44.28 X |
| 5,481,517 | 1/1996 | Yoshimoto et al. | 369/44.28 |

FOREIGN PATENT DOCUMENTS 4-98660  3/1992  Japan .

*Primary Examiner*—Muhammad N. Edun
*Attorney, Agent, or Firm*—Armstrong, Westerman Hattori, McLeland & Naughton

[57] ABSTRACT

A tracking servo system of an optical disk apparatus is formed of a pickup irradiating laser on an optical disk on which information is recorded to reproduce the information, a tracking error detecting circuit detecting a tracking error signal TES which is a servo signal acquired by the pickup, a tracking control circuit performing tracking control based on the tracking error signal TES detected by the tracking error detecting circuit, a track jump control circuit controlling a track jump based on the tracking error signal TES, and a driver supplying a control signal from the tracking control circuit and the track jump control circuit through an adding circuit and driving an actuator of the pickup.

The light emitted from the laser in the pickup is reflected by the optical disk having a spiral information track and led to the pickup again. From the quantity of reflected light detected by a photodiode in the pickup, a tracking error signal TES showing displacement quantity from the center of the information track of the optical spot is computed by the tracking error detecting circuit. The tracking error signal is supplied to the tracking control circuit and track jump circuit.

20 Claims, 6 Drawing Sheets

TRACK JUMP CONTROL CIRCUIT OF OPTICAL DISK APPARATUS PROPERLY CONTROLLING TIMING OF ACCELERATING PULSES AND DECELERATING PULSES, AND PERFORMING STABLE TRACK JUMP

BACK GROUND OF THE INVENTION

1. Field of the Invention

This invention relates to a track jump control circuit of an optical disk apparatus which applies output accelerating pulses and decelerating pulses to an actuator and moves an optical spot to an adjacent information track.

2. Related Art Statement

In an optical disk apparatus, a track jump control device has been provided to move an optical spot to an adjacent track. Generally, a track jump is performed by successively supplying accelerating pulses and decelerating pulses to an actuator to move an optical spot near an adjacent track after a tracking servo which causes an optical spot to follow a track is off, and making the tracking servo on again and leading an optical spot to the track.

When a track jump is performed, a position of an adjacent track is to change during the jump if the center of a disk is eccentric. Therefore, on a disk having large decentering, a jump might be failed. Even when the sensitivity of an actuator also changes with the change in temperature or the like, a jump might be failed because an optical spot cannot be sufficiently moved by accelerating pulses and decelerating pulses.

To solve such problems, for example, in a track jump method described in Japanese Patent Laid Open H4-98660/1993, the timing of a zero cross of a tracking error signal generated at the intermediate point directed to an adjacent track is detected and pulse width is changed in accordance with the condition of the eccentricity by switching between accelerating pulses and decelerating pulses with this timing, so that a track jump can be reliably performed.

In order to reduce consumed electricity at a tracking actuator, it is necessary to raise actuator's driving sensitivity. However, if it is raised, the number of coil turns generally increases and the inductance of the actuator enlarges. Also, even in the case of performing all tracking procedures only with VCM (voice coil motor: a coarse actuator) to simplify an actuator, the inductance which is needed to be driven enlarges.

Nevertheless, in the method for switching between accelerating pulses and decelerating pulses with the timing of a zero cross point of such a tracking error signal, that is, the intermediate point for jumping to an adjacent track, when an actuator having a large inductance is used, it is delayed that electric currents are switched from accelerating currents to decelerating currents because of the inductance. Thus, there is a problem that an optical spot is easily failed to be led to a track since a residual speed at reaching an adjacent track increases.

OBJECTS AND SUMMARY OF THE INVENTION

An object of this invention is to provide a track jump control circuit of an optical disk apparatus which can perform stable track jump operation even if an inductance is a big actuator.

Another object of this invention is to provide a track jump control circuit of an optical disk apparatus which switches over pulses with the timing of a zero cross of a tracking error signal after phase advancing means in a tracking servo loop passes and does not need a special circuit, such as a high-pass filter for detecting timing.

A track jump control circuit of an optical disk apparatus of this invention comprises an optical head irradiating an optical spot onto an information track of an optical disk, optical head moving means for moving the optical head with respect to said optical disk in order to move said optical spot onto a track adjacent to the information track, accelerating pulse generating means for generating accelerating pulses in accelerating movement of the optical head moving means, decelerating pulse generating means for generating decelerating pulses in decelerating movement of the optical head moving means, and timing signal output means for outputting a timing signal at earlier time than a time when the optical spot irradiated by the optical head which is moved by the optical head moving means reaches an intermediate point from the information track on which the optical spot is irradiated by the optical head to the track adjacent to the information track, wherein the accelerating pulse generating means stops an output of the accelerating pulses in accordance with an output of the timing signal.

The other features and advantages of this invention will be sufficiently apparent in the following explanation.

BRIEF DESCRIPTION OF THE DRAWINGS

FIG. 1 is an illustration showing a conceptual configuration of a tracking servo system of an optical disk apparatus including a track jump control circuit of the optical disk apparatus of this invention;

FIG. 2 is a block diagram showing a configuration of the track jump control circuit in FIG. 1;

FIG. 3 is a timing chart describing the action of the track jump control circuit in FIG. 2;

FIG. 4 is a block diagram showing a configuration of the track jump control circuit;

FIG. 5 is a timing chart describing the action of the track jump control circuit in FIG. 4;

FIG. 6 is a block diagram showing a configuration of a track jump control circuit; and FIG. 7 is a timing chart describing the action of the track jump control circuit in FIG. 6.

DETAILED DESCRIPTION OF THE PREFERRED EMBODIMENTS

First, the first embodiment of this invention will be explained.

Figure 1:
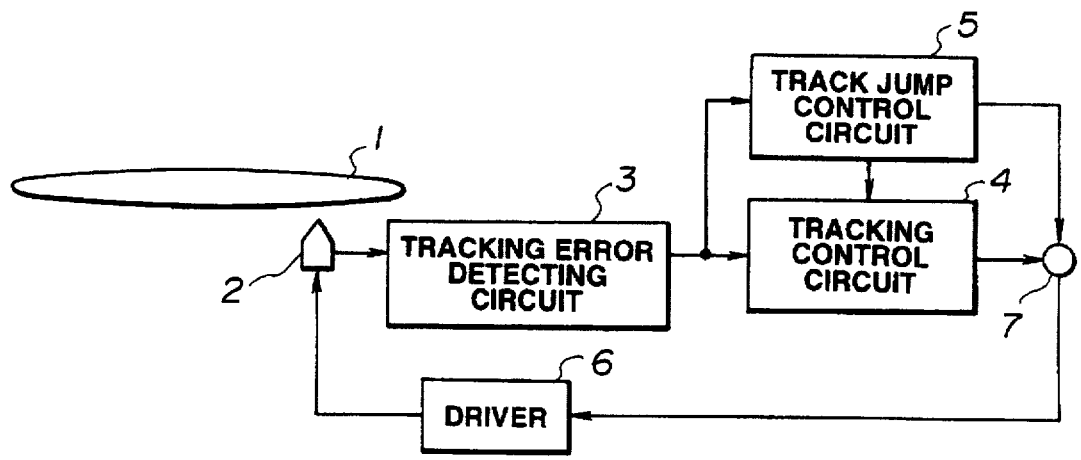
FIGS. 1–3 relate to a first embodiment of this invention.

As shown in FIG. 1, a tracking servo system of an optical disk apparatus is formed of a pickup 2 irradiating laser on an optical disk 1 on which information is recorded to reproduce the information, a tracking error detecting circuit 3 detecting a tracking error signal TES which is a servo signal acquired by the pickup 2, a tracking control circuit 4 performing tracking control based on the tracking error signal TES detected by the tracking error detecting circuit 3, a tracking jump control circuit 5 controlling a track jump based on the tracking error signal TES, and a driver 6 supplying a control signal from the tracking control circuit 4 and the track jump control circuit 5 through an adding circuit 7 and driving an actuator (not shown) of the pickup 2.

The light emitted from the laser in the pickup 2 is reflected by the optical disk 1 having a spiral information track and led to the pickup 2 again. From the quantity of reflected light detected by a photodiode in the pickup 2, a tracking error signal TES is computed by the tracking error detecting circuit 3 showing displacement quantity from the center of the information track of the optical spot. The tracking error signal is supplied to the tracking control circuit 4 and the track jump circuit 5.

Ordinarily, a tracking servo for making an optical spot follow an information track is performed by driving the actuator in the pickup 2 through the adding circuit 7 and the driver 6 by the output of the tracking control circuit 4.

In the case of performing a track jump to an adjacent track, a track jump command, Jump Start, which will be stated later, is fed from a higher-rank controller (not shown) into the track jump control circuit 5, where Jump Start is received and Servo Off, which will be stated later, is fed into the tracking control circuit 4. Then, the servo operation at the tracking control circuit 4 stops. The output of the track jump control circuit 5 is supplied to the adding circuit 7 and the driver 6 to drive an actuator (not shown).

Figure 2:
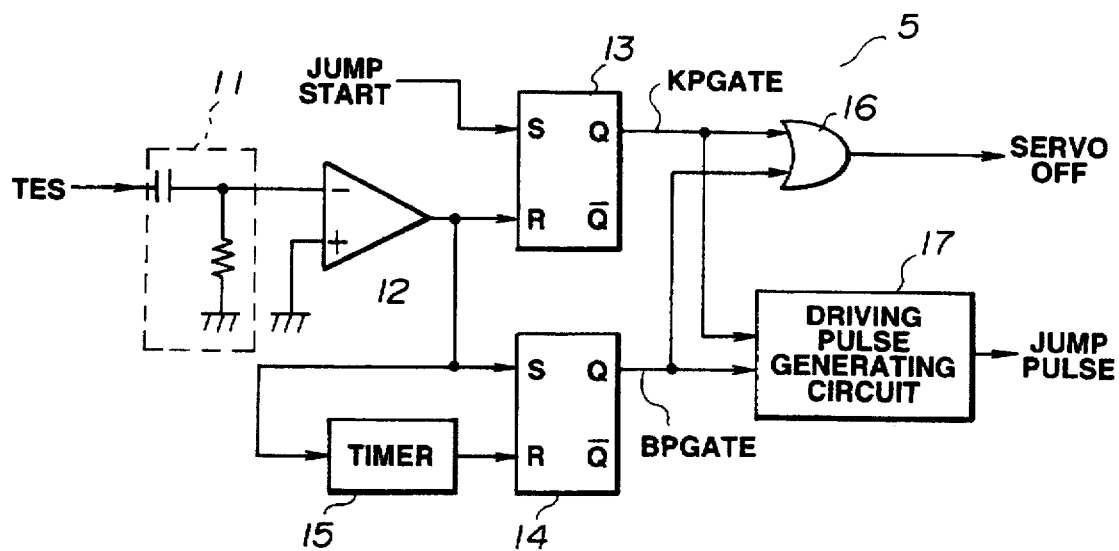

As shown in FIG. 2, the track jump control circuit 5 is formed of a high-pass filter 11 extracting high-frequency component of a tracking error signal TES, a zero cross comparator 12 (timing signal output means) comparing the output of the high-pass filter 11 and a zero level, a S-R flip flop 13 (accelerating pulse generating means) generating a gate signal KPGATE of an accelerating pulse, a S-R flip flop 14 (decelerating pulse generating means) generating a gate signal BPGATE of a decelerating pulse, a timer 15 controlling the S-R flip flop 14, an OR circuit 16 generating a Servo Off signal which is a control signal for controlling a tracking servo state using the output of the S-R flip flop 13 and 14, and a driving pulse generating circuit 17 generating a driving pulse driving and controlling the driver 6 using the output of the S-R flip flop 13 and 14.

In other words, in response to the output gate signals KPGATE and BPGATE supplied by the S-R flip flop 13 and 14, a driving pulse added to an actuator at the driving pulse generating circuit 17 is generated and a SERVO OFF signal of a tracking servo at the OR circuit 16 is generated.

Next, the operation of the track jump control circuit 5 formed in this way will be explained.

Figure 3:
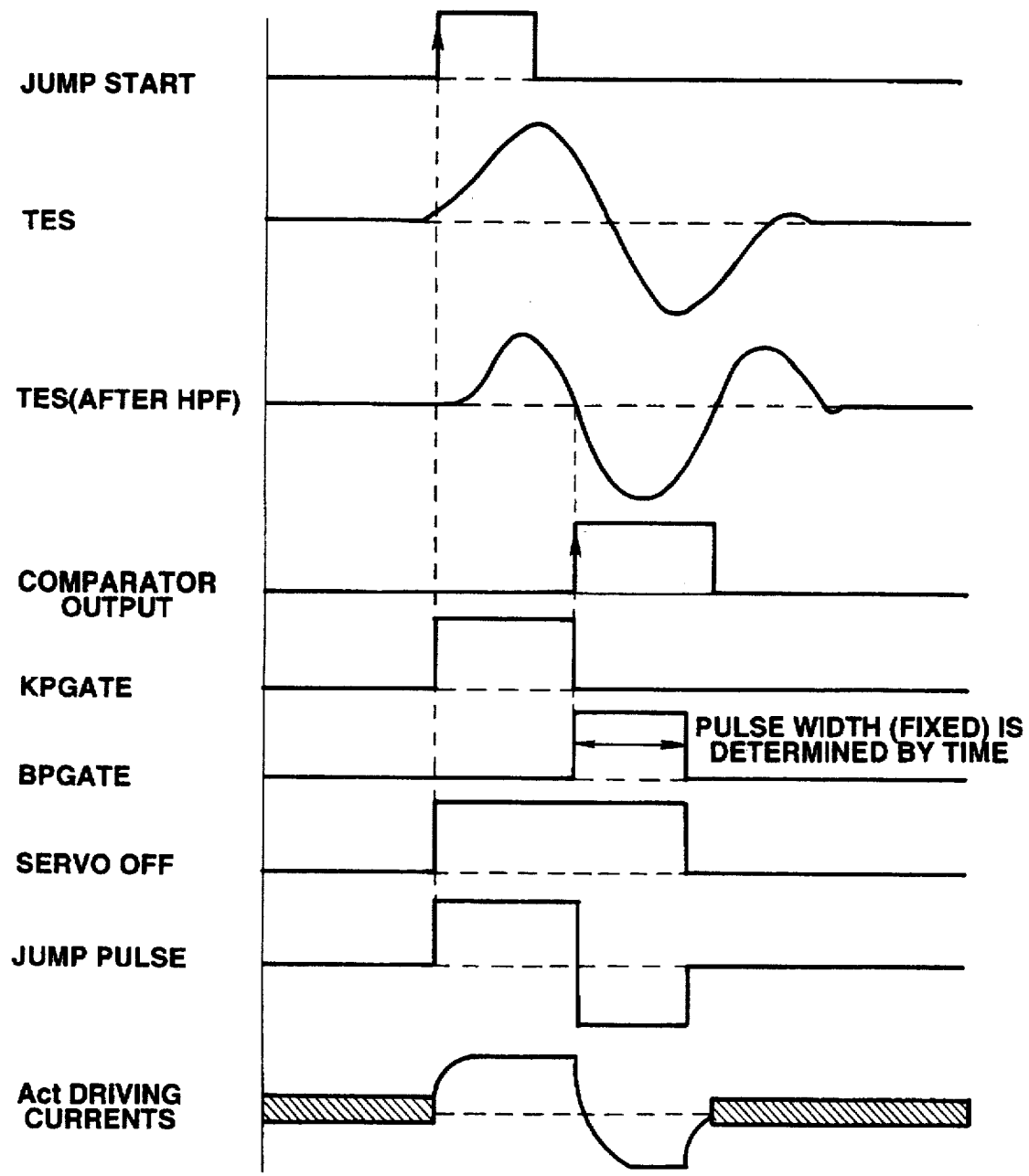

As shown in FIG. 3, a track jump command, Jump Start is supplied from a higher-rank controller (not shown) to the S-R flip flop 13 (Jump Start in FIG. 3). By this command, the flip flop 13 is set and with the start of outputting a gate signal KPGATE of an accelerating pulse, a tracking servo is off (Servo Off)(KPGATE and Servo Off in FIG. 3). In accordance with the KPGATE, a driving signal of an actuator, Jump Pulse is supplied from the driving pulse generating circuit 17 (Jump Pulse in FIG. 3).

By means of Jump Pulse, electric currents, such as Act Driving Currents in FIG. 3 flow in the actuator and an optical spot is accelerated toward an adjacent track, so that a tracking error signal TES changes like TES in FIG. 3. The tracking error signal TES is supplied to the high-pass filter 11 and becomes a waveform like TES (after HPF) in FIG. 3 (assuming that a cut-off frequency of the high-pass filter 11 is set for about 3 kHz). The zero cross of TES (TES (after HPF) in FIG. 3) after TES passed through the high-pass filter 11 is a little behind the peak of TES (TES in FIG. 3) and has earlier timing than the zero cross of TES.

The zero cross of TES after TES passed through the high-pass filter 11 is detected by the comparator 12 (Comparator Output in FIG. 3). By means of the rise in the output of the comparator 12, the flip flop 13 is reset and KPGATE stops. Then, the flip flop 14 is set and the output of the gate signal BPGATE of decelerating pulses starts (BPGATE in FIG. 3). Thus, the driving pulses of the actuator have inverse polarity to accelerated pulses (Jump Pulse in FIG. 3). At the same time, the timer 15 is activated to start measuring deceleration time.

On the other hand, in the pickup 2, because of the inductance of the actuator, the driving currents have become inverse polarity pulses and the time of starting deceleration is a little delayed from the inversion of the driving pulses (Act Driving Currents in FIG. 3). However, an optical spot is approaching an adjacent track while reducing its moving speed gradually. When it is detected that the deceleration time previously set up by the timer 15 has passed, the flip flop 14 is reset, BPGATE stops, and decelerating pulses end. Simultaneously with it, a tracking servo becomes on again and an optical spot is led into an object track and a track jump action ends.

Also, when a track jump is performed in the opposite direction, the polarity of the driving pulses, Jump Pulse, for KPGATE and BPGATE, Jump Pulse can be reversed and acceleration can be switched to deceleration by means of the rise of the output of the comparator.

The more easily delayed in switching the cut-off frequency of the high-pass filter 11 because of large inductance of the actuator, the better result can be acquired when we cause the cut-off frequency to be higher and the zero cross point to be earlier. Additionally, the decelerating pulses can be output after predetermined time has passed after accelerating pulses stop instead of just after accelerating pulses end.

As mentioned above, according to this embodiment, a stable track jump can be performed even in the actuator in which inductance is large and current switching is delayed because accelerating pulses are switched to decelerating pulses earlier than that an optical spot attains the intermediate point from the information track to an adjacent track by detecting the zero cross point of the tracking error signal after the signal went through the high-pass filter.

Next, the second embodiment of this invention will be explained.

In the second embodiment, a more stable track jump can be performed by making decelerating pulse width variable while decelerating pulse width is fixed in the first embodiment. The same reference numbers as those of the first embodiment are used for the same configuration and only different configurations will be explained.

Figure 4:
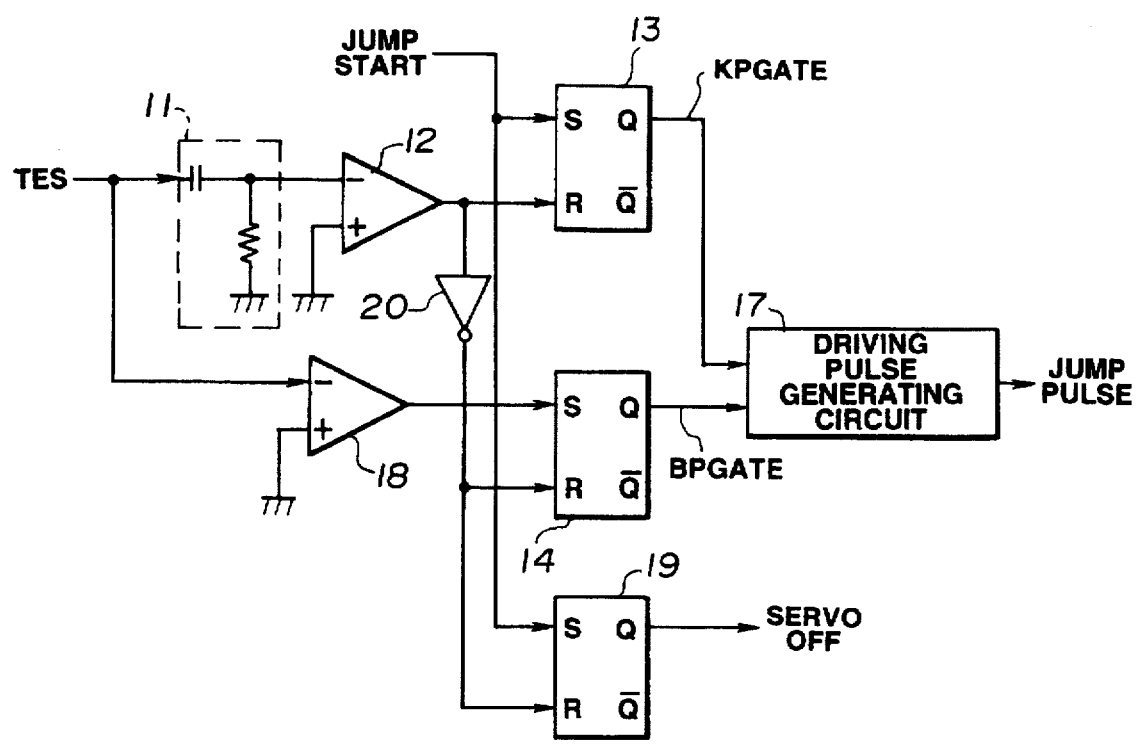
FIGS. 4 and 5 relate to a second embodiment of this invention.

As shown in FIG. 4, the track jump control circuit of the second embodiment is formed of a second comparator 18 detecting a zero cross of a tracking error signal TES, an inverter 20 inverting the output of a comparator 12, and a S-R flip flop 19 generating Servo Off signals for controlling on/off of a tracking servo based on the output of the inverter 20. The other configurations except omitting an OR circuit 16 and a timer 15 are the same as that of the first embodiment.

The operation of the track jump control apparatus of this embodiment formed in this way will be explained.

Figure 5:
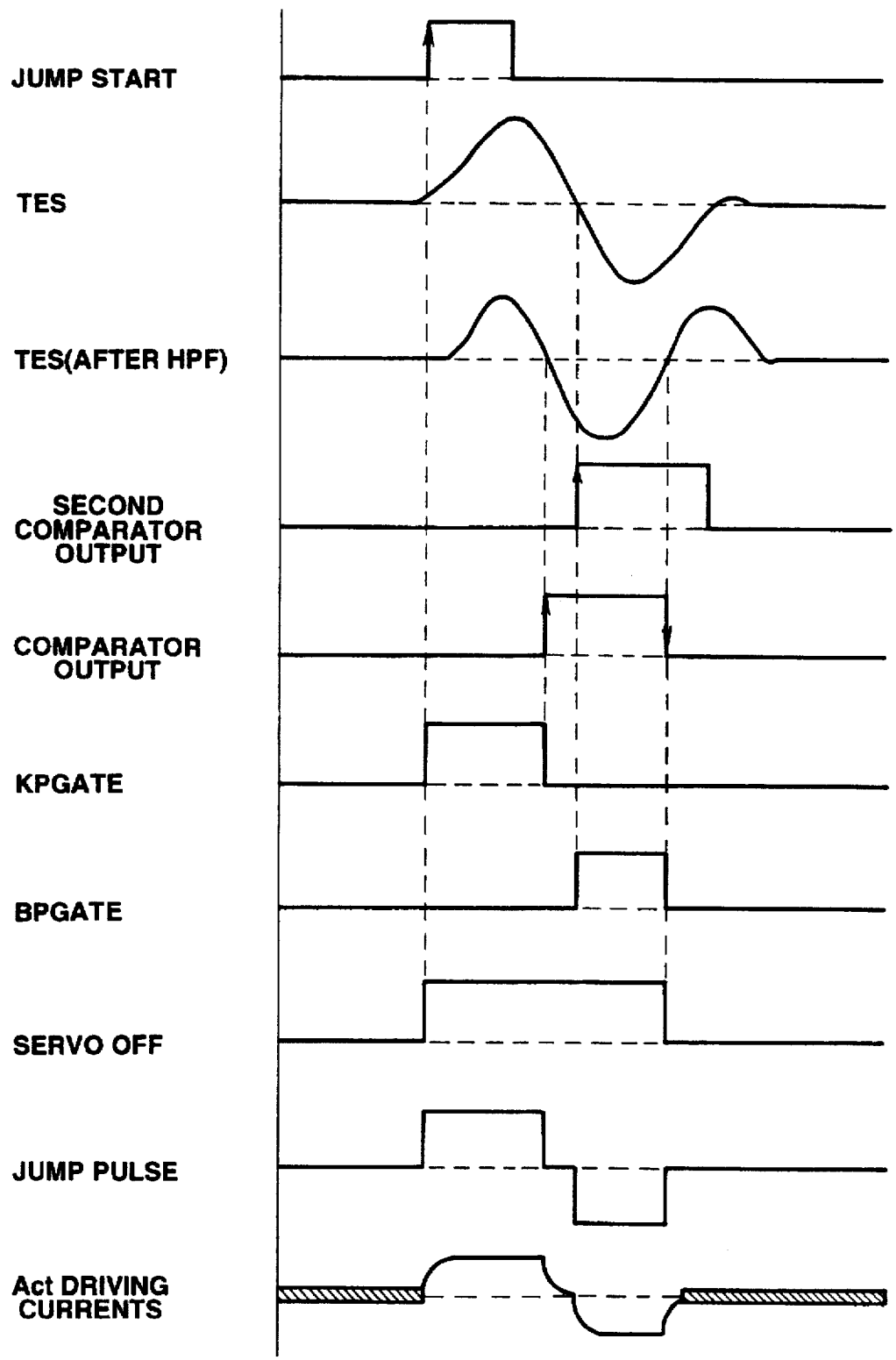
Figure 6:
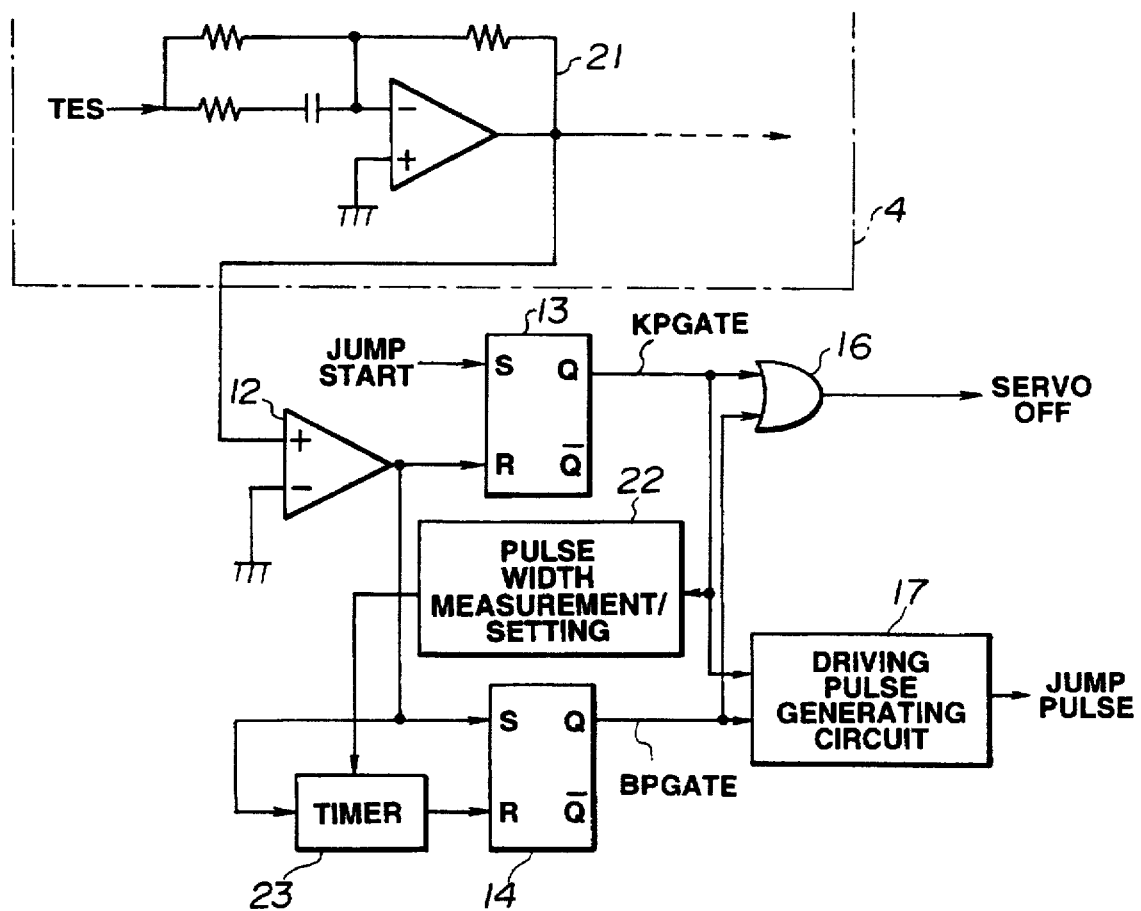
FIGS. 6 and 7 relate to a third embodiment of this invention.

As shown in FIG. 5, a track jump command, Jump Start is supplied from a higher-rank controller (not shown) to a S-R flip flop 13 (Jump Start in FIG. 5). By this command, the flip flop 13 is set and with the start of outputting a gate signal KPGATE of an accelerating pulse, a tracking servo is off (KPGATE and Servo Off in FIG. 5). In accordance with the KPGATE, a driving signal of an actuator, Jump Pulse is supplied from a driving pulse generating circuit 17 (Jump Pulse in FIG. 5).

By means of Jump Pulse, electric currents, such as Act Driving Currents in FIG. 5 flow in the actuator and an optical spot is accelerated toward an adjacent track, so that a tracking error signal TES fluctuates like TBS in FIG. 5. The tracking error signal is supplied to a high-pass filter 11 and becomes a waveform like TES (after HPF) in FIG. 5 (assuming that a cut-off frequency of the high-pass filter 11 is set for about 3 kHz). The zero cross of TES (TES (after HPF) in FIG. 5) after TES passed through the high-pass filter 11 is a little behind the peak of TES (TES in FIG. 5) and has earlier timing than the zero cross of TES.

The zero cross of TES after TES passed through the high-pass filter 11 is detected by the comparator 12 (Comparator Output in FIG. 5). By means of the rise in the output of the comparator 12, the flip flop 13 is reset and KPGATE stops. Then, Jump Pulse once becomes zero and accelerating pulses end.

When the optical spot continues moving as it is and reaches the intermediate point from the information track to the adjacent track, a zero cross appears in TES. The zero cross of TES is detected by a second comparator 18 (Second Comparator Output in FIG. 5). A flip flop 14 is set by the rise in the output of the second comparator 18, and the output of gate signals BPGATE starts (BPGATE in FIG. 5). Thus, the driving pulses of the actuator are accelerated and become inverse polarity pulses, so that deceleration starts (Jump Pulse in FIG. 5).

The optical spot is approaching an adjacent track while reducing its speed gradually. When a zero cross is produced in the TES after passing the high-pass filter again and the output of the comparator 12 falls, the flip flop 14 is reset, BPGATE stops, and decelerating pulses end. At the same time, a flip flop 19 is reset and the tracking servo becomes on again and the optical spot is led into an object track and a track jump action ends.

As mentioned above, according to this embodiment, since deceleration starts at a zero cross of tracking error signals and stops at a zero cross of tracking error signals after the signals goes through the high-pass filter in addition to the effect of the first embodiment, decelerating pulses are output in accordance with the movement of the optical spot and a more stable track jump can be performed.

Next, the third embodiment of this invention will be explained.

The zero cross of the tracking error signals after the tracking error signals pass through the high-pass filter is used to detect timing for stopping accelerating pulses in the first and second embodiments. However, in the third embodiment, a phase advancing filter is used instead of the high-pass filter. The same reference numerals as those of the first embodiment are used for the same configuration and only different configurations will be explained.

In the track jump control circuit in the third embodiment, reference numeral 21 represents a phase advancing filter in a tracking control circuit 4, 22 represents a pulse width measuring/setting circuit which measures pulse width of accelerating pulse gate signals KPGATE and supplies a pulse width setting value predetermined times as large as the measured pulse width of KPGATE, and 23 represents a timer which can set measuring time by the pulse width measuring/ setting circuit 22. The other configuration is the same as that of the first embodiment.

The operation of the track jump control apparatus of this embodiment formed in this way will be explained.

Figure 7:
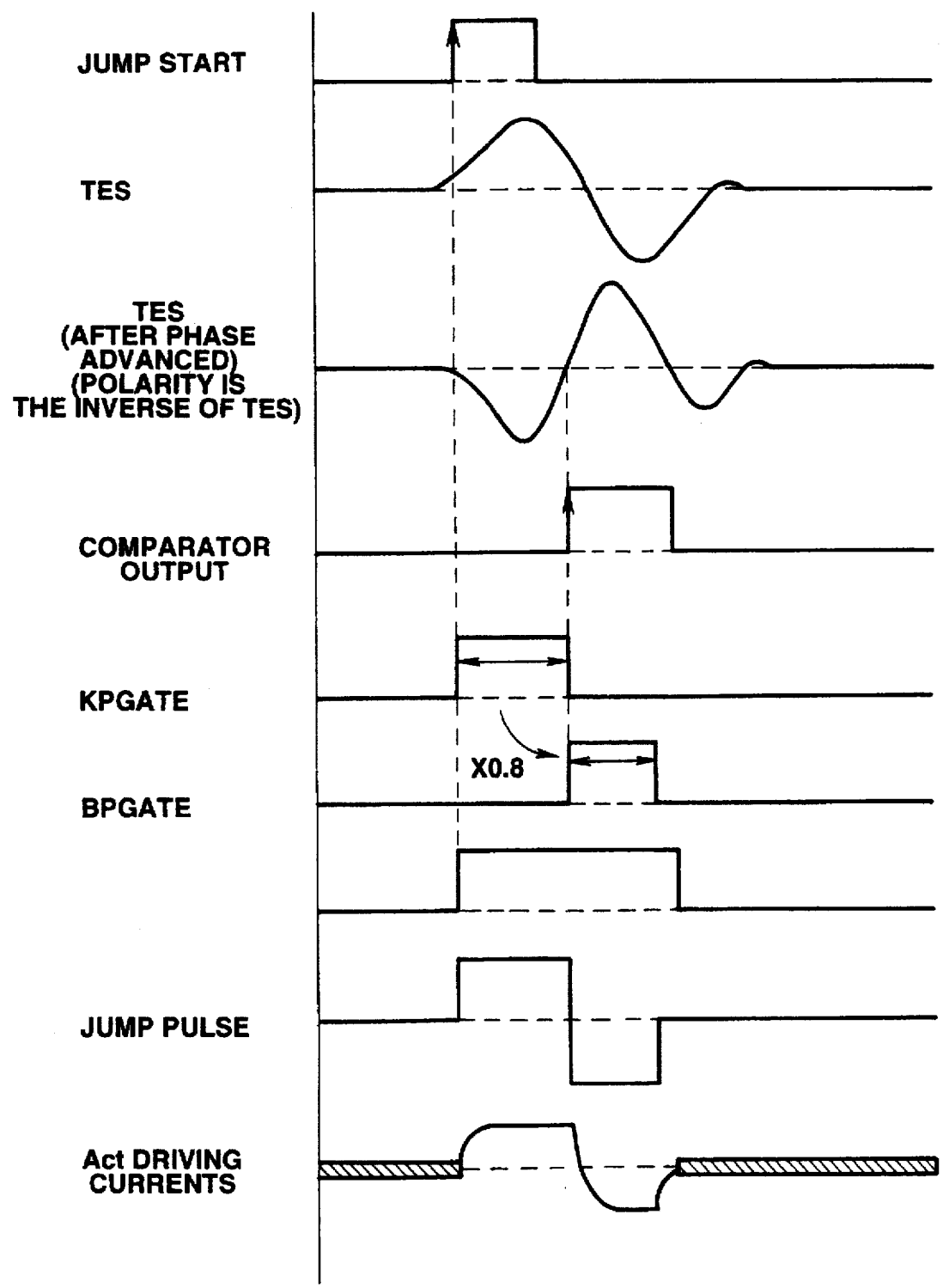

As shown in FIG. 7, a track jump command, Jump Start is supplied from a higher-rank controller (not shown) to a S-R flip flop 13 (Jump Start in FIG. 7). By this command, the flip flop 13 is set and with the start of outputting a gate signal KPGATE of an accelerating pulse, a tracking servo is also off (KPGATE and Servo Off in FIG. 7). In accordance with the KPGATE, a driving signal of an actuator, Jump Pulse is supplied from a driving pulse generating circuit 17 (Jump Pulse in FIG. 7).

By means of Jump Pulse, electric currents, such as Act Driving Currents in FIG. 7 flow in the actuator and an optical spot is accelerated toward an adjacent track, so that a tracking error signal TES fluctuates like TES in FIG. 7. The tracking error signal is supplied to a phase advancing filter 21 and becomes a waveform like TES (after phase advanced) in FIG. 7 (because of the inverse type phase advancing filter, it is the inverse polarity to TES). The zero cross of the TES (TES (after phase advanced) in FIG. 7) after TES passed through the phase advancing filter is a little behind the peak of TES (TES in FIG. 7) and has earlier timing than the zero cross of TES.

The zero cross of TES after TES passed through the phase advancing filter 21 is detected by the comparator 12 (Comparator Output in FIG. 7). By means of the rise in the output of the comparator 12, the flip flop 13 is reset and KPGATE stops. Then, the phase width of KPGATE is measured by means of a pulse width measuring/setting circuit 22. The value predetermined times as large as the measured pulse width (0.8 times here) is fed to a timer 23.

At the same time, a flip flop 14 is reset by means of the rise in the output of the comparator 12, the output of decelerating pulse gate signals, BPGATE starts (BPGATE in FIG. 7), and the timer 23 is activated. When it is detected that the time which is 0.8 times as long as the accelerating pulse width set by a pulse width measuring/setting circuit 22 using the timer 23 has passed, the flip fop 14 is reset, BPGATE stops, and decelerating pulses end. At the same time, the tracking servo becomes on again, and the optical spot is led to an object track. Thus, the track jump operation ends.

As explained above, according to this embodiment, to detect the timing of stopping the accelerating pulses, a zero cross of the output of the phase advancing filter in a tracking servo circuit is referred to in addition to the effect of the first embodiment, and therefore, it is not necessary to equip a new circuit for detecting timing and a track jump control circuit which suppresses the increase of expenses can be materialized. In addition, because the decelerating pulse width is changed according to the accelerating pulse width, change in sensitivity of an actuator can be absorbed and a stable track jump can be performed even when sensitivity of an actuator changes.

Further, the decision of the timing of starting to reduce speed can be made by, for example, detecting the extinction of accelerating pulse component from the driving currents of the actuator besides the method of each embodiment. In the actuator having large inductance, even if accelerating pulses stop, electric currents flowed in the actuator is to remain for a while in accordance with the accelerating pulses. Accordingly, even if driving pulses stop, the electric currents do not become zero immediately. When electric currents in the actuator are driven, the output voltage of a driver becomes approximate saturation output voltage. Thus, the extinction of accelerating currents can be detected because the output voltage become a predetermined value and less (of course, an electric current value can be directly watched). When speed is started to be reduced after accelerating currents became extinct, accelerating driving currents and decelerating driving currents are separated, so that a changeover from acceleration to deceleration can be more positively performed and the actuator is precisely controlled. Thus, a track jump operation is stabilized.

In addition to the explanation in the aforesaid embodiments, various combination in timing judging methods of stopping accelerating pulses, starting decelerating pulses, and stopping decelerating pulses can be considered. For example, as explained in the third embodiment, acceleration is stopped at the zero cross of the phase advancing filter output, and as explained in the first embodiment, decelerating pulses can be output with fixed width just after accelerating pulses stop as explained in the first embodiment. Regarding the timing of making the tracking servo on/off, the servo is returned to be on at the end of decelerating pulses in this embodiment. However, the servo may be turned on a little earlier to shorten a servo-off period a little.

In the embodiments mentioned above, although a tracking error signal TES is used to judge the timing, the timing can be judged by, for example, add signals of detectors showing the intensity of reflected light. When timing is judged from tracking error signals, earlier timing than the intermediate point can be acquired by detecting levels of tracking error signals instead of using a zero cross in the output of a high-pass filter or a phase advancing filter as shown in the embodiments. For example, after tracking error signals once exceed some reference voltage, a method in which lower timing than the reference voltage is used again can be considered. In this case, the timing which stops accelerating pulses can be adjusted by fluctuating the reference voltage.

Furthermore, the timing which is obtained from the tracking error signals or the like after the signals pass through a high-pass filter or the phase advancing filter is not to detect that the tracking error signals pass a zero cross. It can be detected that an offset specified value can be detected from a zero level. In this case, optimization can be carried out so that a more stable jump can be performed by adjusting an offset amount.

In the aforesaid explanation, only the case of one track jump which performs a jump to an adjacent track is explained. That can also be applied to the case in which jumps are performed on a plurality of tracks at once. That is, using the zero cross of TES after TES passes through a high-pass filter (HPF) or a phase advancing filter, accelerating pulses generated around the intermediate point between the zero cross and an object track stops and can be switched to decelerating pulses. For example, in the case of performing jumps on two tracks, accelerating pulses can be stopped by the second zero cross of TES, which is generated, after TES passes through HPF or a phase advancing filter.

In this embodiment, it is apparent that working modes different in a wide range can be formed on the basis of this invention without departing from the spirit and scope of this invention. The invention is not restricted by its specific working modes except as limited by the appended claims.

What is claimed is:

1. A track jump control circuit of an optical disk apparatus comprising:

an optical head irradiating an optical spot onto an information track of an optical disk;

optical head moving means for moving said optical head with respect to said optical disk in order to move said optical spot onto an object track adjacent to said information track which is an irradiating object of said optical spot by said optical head;

accelerating pulse generating means for generating accelerating pulses for accelerating movement of said optical head moving means;

decelerating pulse generating means for generating decelerating pulses for decelerating movement of said optical head moving means; and timing signal output means, having as an input a tracking error signal representing displacement from a center of said information track of said optical spot, and in response to said tracking error signal, for producing and outputting a timing signal at an earlier time than a time when said optical spot irradiated by said optical head which is moved by said optical head moving means reaches an intermediate point from said information track to said object track;

wherein said accelerating pulse generating means stops an output of said accelerating pulses in response to said timing signal.

2. A track jump control circuit of an optical disk apparatus according to claim 1, wherein said timing signal output means has low frequency reducing means for reducing or eliminating low frequency components of said tracking error signal, said timing signal output means outputting said timing signal in response to an output of said low frequency reducing means.

3. A track jump control circuit of an optical disk apparatus according to claim 1, wherein said timing signal output means has phase advancing means for advancing the phase of said tracking error signal, said timing signal output means outputting said timing signal in response to an output of said phase advancing means.

4. A track jump control circuit of an optical disk apparatus according to claim 1, wherein an absolute value of said tracking error signal becomes a second predetermined value and below again after once the absolute value becomes a first predetermined value, so that said timing signal output means outputs said timing signal.

5. A track jump control circuit of an optical disk apparatus comprising:

an optical head irradiating an optical spot onto an information track of an optical disk;

optical head moving means for moving said optical head with respect to said optical disk in order to move said optical spot onto an object track adjacent to said information track which is an irradiating object of said optical spot by said optical head;

accelerating pulse generating means for generating accelerating pulses for accelerating movement of said optical head moving means;

decelerating pulse generating means for generating decelerating pulses for decelerating movement of said optical head moving means; and timing signal output means, having as an input a tracking error signal representing displacement from a center of said information track of said optical spot, and in response to said tracking error signal, for producing and outputting a timing signal at an earlier time than a time when said optical spot irradiated by said optical head which is moved by said optical head moving means reaches an intermediate point from said information track to said track adjacent to said information track;

wherein said accelerating pulse generating means stops an output of said accelerating pulses in accordance with said timing signal.

6. A track jump control circuit of an optical disk apparatus according to claim 5, wherein said timing signal output means has low frequency reducing means for reducing or eliminating low frequency components of said tracking error signal, said timing signal output means outputting said timing signal in response to an output of said low frequency reducing means.

7. A track jump control circuit of an optical disk apparatus according to claim 5, wherein said timing signal output means has phase advancing means for advancing the phase of said tracking error signal, said timing signal output means outputting said timing signal in response to an output of said phase advancing means.

8. A track jump control circuit of an optical disk apparatus according to claim 5, wherein an absolute value of said tracking error signal becomes a second predetermined value and below again after once the absolute value becomes a first predetermined value, so that said timing signal output means outputs said timing signal.

9. A track jump control circuit of an optical disk apparatus as in any one of claims 1–8, wherein said decelerating pulse generating means starts outputting said decelerating pulses when said tracking error signal becomes a predetermined value.

10. A track jump control circuit of an optical disk apparatus as in any one of claims 1–8, wherein said decelerating pulse generating means starts outputting said decelerating pulses when said accelerating pulses end.

11. A track jump control circuit of an optical disk apparatus as in any one of claims 1–8, wherein said decelerating pulse generating means starts outputting said decelerating pulses in accordance with extinction of electric currents flowing in said optical head moving means in response to said accelerating pulses.

12. A track jump control circuit of an optical disk apparatus according to claims 2 or 6, wherein said decelerating pulses are stopped in response to an output of said low frequency reducing means.

13. A track jump control circuit of an optical disk apparatus according to claim 3 or 7, wherein said decelerating pulses are stopped in response to an output of said phase advancing means.

14. A track jump control circuit of an optical disk apparatus as in any one of claims 2, 3, 4, 6, 7 and 8, wherein a pulse width of said decelerating pulses has a predetermined ratio to a pulse width of said accelerating pulses, said predetermined ratio being not equal to 1.

15. A track jump control circuit of an optical disk apparatus as in any one of claims 2, 3, 4, 6, 7 and 8, wherein a pulse width of said decelerating pulses has a predetermined value.

16. A track jump control circuit of an optical disk apparatus as in any one of claims 2, 3, 4, 6, 7 and 8, wherein a pulse width of said decelerating pulses has a predetermined value which is previously determined and said decelerating pulse generating means starts outputting said decelerating pulses in response to an end of said accelerating pulses.

17. A track jump control circuit of an optical disk apparatus as in any one of claims 2, 3, 4, 6, 7 and 8, wherein said accelerating pulses have a pulse width which has a predetermined ratio to a pulse width of said accelerating pulses, said predetermined ratio being not equal to 1, and said decelerating pulse generating means starts outputting said decelerating pulses in response to an end of said accelerating pulses.

18. A track jump control circuit of an optical disk apparatus as in any one of claims 2, 3, 4, 6, 7 and 8, wherein a pulse width of said decelerating pulses has a predetermined value and said decelerating pulse generating means starts outputting said decelerating pulses when said tracking error becomes a predetermined value.

19. A track jump control circuit of an optical disk apparatus as in any one of claims 2, 3, 4, 6, 7 and 8, wherein a pulse width of said decelerating pulses has a predetermined ratio to a pulse width of said accelerating pulses, said predetermined ratio being not equal to 1, and said decelerating pulse generating means starts outputting said decelerating pulses when said tracking error signal becomes a predetermined value.

20. A track jump control circuit of an optical disk apparatus comprising:

an optical head irradiating an optical spot onto an information track of an optical disk;

optical head moving means for moving said optical head with respect to said optical disk in order to move said optical spot onto an object track adjacent to said information track which is an irradiating object of said optical spot by said optical head;

accelerating pulse generating means for generating accelerating pulses for accelerating movement of said optical head moving means;

decelerating pulse generating means for generating decelerating pulses for decelerating movement of said optical head moving means; and timing signal output means for outputting a timing signal at an earlier time than a time when said optical spot irradiated by said optical head which is moved by said optical head moving means reaches an intermediate point from said information track to said object track adjacent to said information track, said timing signal output means being responsive to a tracking error signal representing displacement from a center of said information track of said optical spot;

wherein said accelerating pulse generating means stops an output of said accelerating pulses in response to and in accordance with said timing signal;

wherein said timing signal output means has low frequency reducing means for reducing or eliminating low frequency components of said tracking error signal, and said timing signal output means outputs said timing signal in response to an output of said low frequency reducing means.

* * * * *